United States Patent [19]

Czerwon et al.

[11] 4,078,033
[45] Mar. 7, 1978

[54] PROCESSES AND APPARATUS FOR LIQUID BATH COOLING OF EXTRUDED FOILS

[75] Inventors: Dieter Czerwon, Huckeswagen-Wiehagen; Friedrich Rüppel, Wuppertal-Langerfeld; Siegfried Braun, Wipperfurth, all of Germany

[73] Assignee: Barmag Barmer Maschinenfabrik Aktiengellschaft, Wuppertal, Germany

[21] Appl. No.: 653,473

[22] Filed: Jan. 29, 1976

[30] Foreign Application Priority Data

Feb. 6, 1975   Germany ................ 2504970

[51] Int. Cl.$^2$ ................ D01D 3/00; D01D 5/08
[52] U.S. Cl. ................ 264/178 R; 264/180; 425/71
[58] Field of Search ............... 425/71, 72; 264/178 F, 264/178 R, 180, 181, 237

[56] References Cited

U.S. PATENT DOCUMENTS

| | | | |
|---|---|---|---|
| 2,324,397 | 7/1943 | Hull | 264/178 F |
| 3,729,539 | 4/1973 | Hill | 264/178 R |
| 3,886,243 | 5/1975 | Uemura et al. | 425/71 |
| 3,932,576 | 1/1976 | Patel | 264/178 R |

FOREIGN PATENT DOCUMENTS

| | | | |
|---|---|---|---|
| 2,145,706 | 10/1972 | Germany | 425/71 |
| 47-42374 | 10/1972 | Japan | 425/71 |
| 990,132 | 4/1965 | United Kingdom | 425/71 |
| 972,023 | 10/1964 | United Kingdom | 264/178 F |

Primary Examiner—Jay H. Woo

[57] ABSTRACT

Process for cooling a freshly extruded, incompletely solidified foil of a thermoplastic polymer by extruding said foil into a liquid cooling bath and directing against said foil below the bath surface along a line extending the entire width of said foil at least one narrow, unbroken stream of cooling liquid. The stream(s) respectively are directed angularly against a side of said foil at right angles thereto or in a direction opposite to the direction of movement of said foil into said bath, i.e., at an angle between 0° and 60° relative to a plane which is normal to said foil. The apparatus embodies an extrusion nozzle for extruding the foil downwardly into a body of cooling liquid in a tank directly below said nozzle. One or more tubes are normally immersed in said body of liquid and extend longitudinally parallel to and in juxtaposition to the foil entering said body of cooling liquid and also parallel to the upper surface of the cooling liquid. The tube(s) have a longitudinal slit which faces the foil and is at least substantially coextensive with the width of nozzle and the width of the foil extruded therefrom, and a pipe within each tube to supply a cooling liquid to each tube, such pipe(s) being at least substantially coextensive with the slit and extending longitudinally inside said tube(s) in spaced relationship thereto. Such pipe(s) have a plurality of liquid discharge holes directed toward the side of the tube(s) which is directly opposite to said longitudinal slit.

6 Claims, 4 Drawing Figures

PROCESSES AND APPARATUS FOR LIQUID BATH COOLING OF EXTRUDED FOILS

Cooling freshly extruded foils in a water bath is a frequently used process. Although measures have been taken to perfect this cooling process, it still has defects which considerably impair the quality of the finished foil and of the end products made therefrom.

The cooling water in the immediate vicinity of the foil is heated more intensely than in more remote zones of the bath. Thus, the coolant which comes directly in contact with the hot foil entering the bath, at least in the middle zone of the foil width, reaches the boiling point. Bubbles form on the surface of the immersed foil, which is just beginning to solidify. These phenomena have in many respects an adverse effect on the foil. Scarrings in the surface occur, which in the later stretching of the foil lead to differing thicknesses of the foil or longitudinal subdivisions thereof and non-uniform orientation of the molecular structure and, under some circumstances, even to formation of surface cracks. The high cooling-water temperature in the immediate zone of the foil web also leads to the result that the cooling rate is so substantially reduced that the foil undergoes a considerable lateral shrinkage. Shrinkage means the reduction of the web width as a consequence of heating distortion and cooling, thereby causing lateral contraction of the thermoplastic polymer. Rapid cooling, as experience has shown, reduces this phenomenon. By shrinkage in the foil width, the foils become thicker in the edge zones than in the middle. This wall thickness difference and the difference of the cooling water temperature with respect to the foil width have, furthermore, the disadvantage that irregular, internal, foil tensions arise, which results in a buckling of the foil. This buckling of the foil is very disadvantageous to running of the foil through the draw-off roller pair located immediately above the cooling bath. Folds can form in the foil, which, in turn, in the later lengthwise cutting of the foil for production of bands or ribbons, can lead to irregular and jagged, cut edges. Such ribbons or bands are unusable for most practical purposes, for example, for fabric production.

According to Swiss Pat. No. 461,776, a bath for cooling continuous films of thermosplastic material is described. A rapid cooling of the foil is achieved by drawing off the heated cooling water from the vicinity of the foil immediately below the cooling bath surface. Special attention is directed to avoidance of turbulences on the surface of the foil. The draw-off of the cooling fluid takes place at such a distance from the foil that the cooling effect is not intensive enough to provide the requisite rapid cooling of the foil. In this structure, tubes are more deeply immersed in the cooling bath, between which tubes the foil passes. These tubes have longitudinal slits, through which water and foil-adhering gas bubbles are drawn off. The distance between the tubes and the entry line of the foil into the cooling bath is so great that the foil essentially is solidified before reaching the active zones of the tubes. The drawing off of the bubbles from the foil surfaces occurs too late to prevent their harmful effect on the foil surfaces.

In German Pat. No. 1,187,007, a foil is extruded downwardly into a cooling bath in which are submerged nozzles. These nozzles direct streams of liquid upwardly on both sides of the foil near its entry into the bath. The streams first flow parallel with the foil and then diverge near the surface of the bath upwardly and outwardly away from the foil.

Underlying the invention herein is the problem developing a process and providing an apparatus, both of which achieve a rapid foil-cooling, which is substantially uniform over the entire width of the freshly extruded foil entering the cooling bath, in order, in particular, to prevent the disadvantageous buckling of the foil. Moreover, the development of gas bubbles on the surface of the foil is prevented, thereby eliminating adverse effect upon foil uniformity and quality.

The process of the invention makes possible a rapid and especially uniform cooling of the foil over its entire width, which is very clearly perceptible by the observance of the "frost line." The "frost line" to the specialist means the visible transition of an area of the foil from the molten fluid state into the solidified, hardened state. Such area, in the process of this invention, has a small longitudinal dimension compared with previous experiences. In particular, the longitudinal dimension is uniform over the entire width of the foil relative to the liquid surface of the cooling bath. Simultaneously the above-described disadvantageous effects of the non-homogeneous cooling are eliminated, particularly the buckling of the foil.

The direction of the cooling streams at an angular direction with a vector opposite to the direction of foil movement into the cooling bath induces, surprisingly, in the resultant, more rapidly cooled foil leaving the cooling bath, considerably less liquid adhering to the exiting foil than with a less rapidly cooled foil. More rapid drying of the foils produced herein is of positive significance for the continuous further processing thereof. The angle of incidence of the cooling stream(s) upon respective side(s) of the foil has proved advantageous especially in respect to the rapid cooling of the foil.

The subject processes for cooling freshly extruded, incompletely solidified foils of a thermoplastic polymer thus embody extruding the foil into a liquid cooling bath, and directing against a side(s) of the foil below the surface of the bath at least one narrow, unbroken stream of cooling liquid along a line extending the entire width of the foil. The stream(s) respectively are directed angularly against a side of foil at right angles thereto or in a direction opposite to the direction of movement of the foil into said bath, i.e., at an angle between 0° and 60° relative to a plane which is normal to the foil at the line of incidence of each stream against the foil. Preferably, two of these streams are applied simultaneously and symmetrically against directly opposite sides of the foil.

The apparatus of the invention fulfills not only the process functions and requirements in an expedient and sure manner, but it is, moreover, simple in its construction and relatively inexpensive to construct.

The apparatus comprises an extrusion nozzle for extruding downwardly a foil of molten, thermoplastic polymer into a body of cooling liquid in a tank directly below the nozzle. One or more tubes are immersed in the body of cooling liquid and are parallel to and in juxtaposition to the foil just after its entering the body of cooling liquid. Such tube(s) preferably are parallel with the surface of the body of the cooling liquid. The tube has a longitudinal slit, which faces the foil and is at least substantially coextensive with the width of the extension nozzle and the foil extruded therefrom. A narrow stream of cooling liquid flowing out of the slit(s) is against a respective side of said foil substantially immediately after its entry into the body of liquid. Optionally, a pair of these tubes is positioned substantially symmetrically on opposite sides of the foil whereby two of said streams are applied simultaneously and substantially symmetrically against directly opposite sides of said foil.

An especially compact tube construction has a pipe extending at least substantially coextensively with tube's nozzle slit and also extending longitudinally inside the tube in spaced relationship thereto. The pipe has a plurality of liquid discharge holes directed toward the side of said tube which is directly opposite to said longitudinal slit, whereby the narrow liquid stream flowing out of the slit is substantially uniform over the whole length of the slit.

Preferred embodiments of the invention are illustrated in the drawing, wherein.

Figure 1:
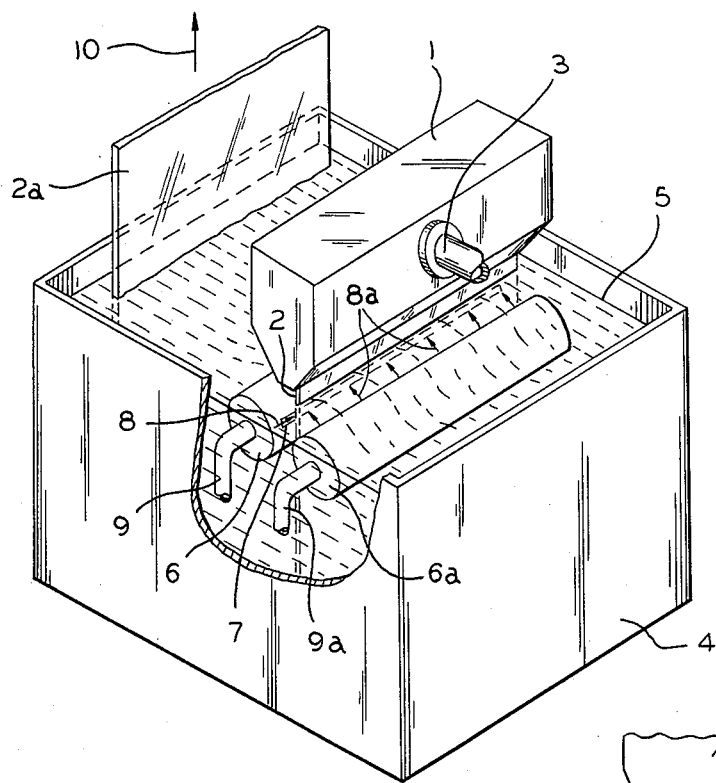
FIG. 1 is a top perspective view of a foil-extrusion nozzle and its associated liquid cooling bath tank, a segment of which is broken away to facilitate illustration of the cooling stream-supplying tubes.
Figure 2:
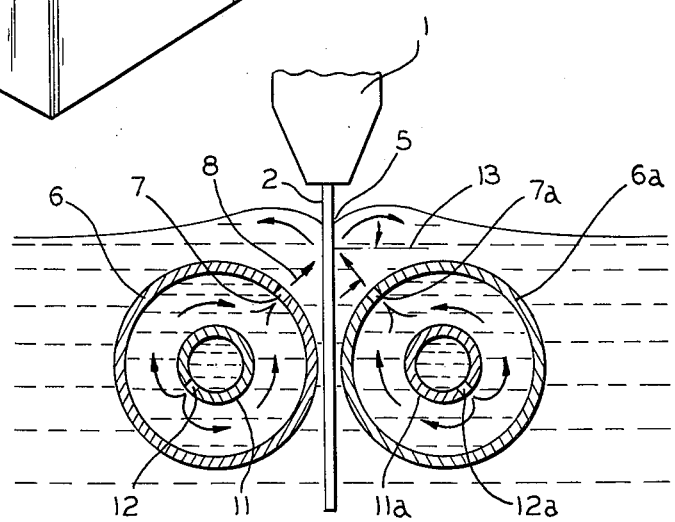
FIG. 2 is a fragmentary side elevation, partly in cross-section, of the extrusion nozzle, extruded foil, bath, slitted tubes and liquid supply pipes within such tubes.

Referring to FIGS. 1 and 2, a wide nozzle 1 for extruding a plastic foil 2 is connected by a pipe connector 3 via a pipe (not represented) to a vessel (not shown) containing a molten theremoplastic polymer composition or an extruder (not shown). The nozzle 1 is positioned above or within the cooling bath tank 4 in such a way that the nozzle slit opening is at a distance of a few millimeters to a few centimeters above the liquid surface 5 of the cooling bath. On both sides of the foil at a slight distance and parallel thereto as well as to one another and to the liquid surface are the two tubes 6 and 6a serving as cooling liquid nozzles. They lie a few centimeters below the liquid surface. Instead of the circular cross-section which is illustrated, the tubes 6 and 6a may have another suitable cross-section, e.g., as shown, for example, in FIGS. 3 and 4.

Each tube 6 has a longitudinal slit 7 which extends across the entire foil width. Water is the usual cooling liquid. The narrow streams of water emerging from the longitudinal slits 7 is schematically indicated by arrows 8 and 8a. The tubular liquid nozzles 6 are connected by flexible lines 9 and 9a with a cooling liquid source (not represented). The flexible lines 9 permit a vertical as well as a lateral adjustment of the pipes 6 and 6a. The brackets for mounting the pipes 6, as well as deflecting rods and draw-off rollers for the foil are omitted in the drawing in the interest of better perspicuity.[1] The draw-off direction of the cooled, solidified foil out of the tank is indicated by an arrow 10.

1. See, for example, German Pat. No. 1,187,007 and U.S. Pat. No. 3,402,428.

In FIG. 2 essential parts of the cooling apparatus are shown in cross-section. The flexible feed lines 9 and 9a (FIG. 1) are connected to distributor elements 11 and 11a extending longitudinally in the interior of the tubes 6 and 6a. They may be pipes positioned coaxially in the tubes and extend substantially at leat the entire length of the longitudinal slit nozzles 7 and 7a. The distributor elements 11 and 11a have a large number of holes 12 and 12a arranged in an axial row and are drilled radially through the walls of the tubular distributor elements 11 and 11a. They thus direct cooling liquid flowing out of the holes against the wall of the tubes 6 and 6a diametrically opposite the respective longitudinal slits 7 and 7a.

The tube-pipe arrangement as well as their cross-section shapes and the sizes of the holes 12 and 12a are chosen in such a way that, as a result of the overall flow resistance arising within the pipes, tubes and slits, the emergence speed of the cooling liquid is uniform over the length of the distributor elements 11 and 11a. By deflection of the cooling fluid after striking upon the inner wall of the tubes and because of the greater flow-through cross-sections on opposite sides of the distributor elements 11 and 11a, the high emergence speed of the liquid streams emerging from the holes 12 and 12a and the high dynamic pressure thereof is transformed into a low flow velocity and dynamic pressure. The changes in the characteristics taking place inside the tubes 6 and 6a to substantially static pressure and a virtually laminar flow pattern bring about a low-turbulence liquid stream exiting from each slit 7 and 7a over the entire lengths of the slits at substantially uniform velocity of the narrow streams directed upon the foil. The liquid flow emerging from the longitudinal slits has an approximately sheetlike form, in which the slit-remote edge of the "sheet" sweeps the entire foil width continuously.

The best results are obtained when the foil is cooled with liquid streams directed against both sides. The upper sides of the tubes 6 and 6a are 10 to 150 mm below the water level of the bath, preferably at a distance between 20 and 80 mm. Their spacing with respect to the foil is chosen in such a way that the incidence lines of the respective water streams upon the foil are underneath the liquid surface of the bath. Their incidence angle ($\alpha$) between a plane normal to the foil and through the line of the incidence lies between 0° and 60°, preferably between 15° and 45°. The speed of the liquid flow is determined in dependence on the incidence angle ($\alpha$) in such a way to provide on the surface of the foil an essentially laminar flow. Turbulences, which cannot be avoided entirely, have no appreciable effect on the properties of the foil surface. Since the tubes 6 and 6a are adjustable vertically and laterally, their relative positions can at any time be adapted to the given conditions and requirements. Preferably their position is selected in such a way that the incidence lines of the two liquid streams on the two sides of the foil web lie extactly opposite one another.

Figures 3, 4:
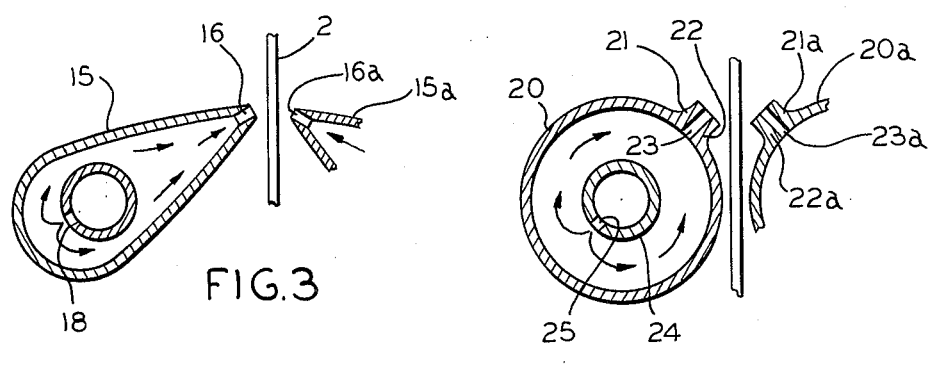
FIG. 3 is a fragmentary cross-section of another embodiment of slitted tubes.
FIG. 4 is a similar, fragmentary cross-section of still another embodiment of slitted tubes.

The tubes 15 and 15a in FIG. 3 have a teardrop or oval shape in cross-section. Their longitudinal slits 16 and 16a are in the tip of the oval whereby the nozzle slits can be positioned closer to the foil 2 than is the case with the embodiment of FIGS. 1 and 2. Cooling liquid is supplied via the axial pipe 17 having a longitudinal row of openings 18 and positioned symmetrically in the tubes 15 and 15a to give a liquid flow pattern as indicated by the arrows.

In FIG. 4, the tubes 20 and 20a are of circular cross-section and have spaced, parallel, longitudinal lips 21, 22 and 21a, 22a forming the longitudinal, liquid discharge, nozzle slits 23 and 23a. Here also, the nozzle slits can be positioned closer to foil 2 than in FIGS. 1 and 2. Each tube 20 and 20a is supplied with cooling liquid via a coaxial pipe 24 containing an axial row of holes like the pipes 11, 11a and holes 12, 12a in FIGS. 1 and 2.

PRIOR ART EXAMPLE

For producing a flat foil, a polypropylene melt with a melt index of 3 grammes per 10 minutes, a temperature of 180° C and a load of 5 kg was plastified in an extruder, its screw having a diameter of 90 mm, and was extruded via a filter through a die with a gap length of 1020 mm and a gap width of 0.6 mm. The extruded foil with a temperature of 265° C left the die gap with an extrusion speed of 6.6 m per minute, then was deflected by means of rollers within and after the liquid cooling bath and then was drawn off with a speed of 14 m per minute.

Approx. 60 mm below the water level of the cooling bath, its temperature being 22° C, there were two slit-shaped nozzles positioned on respective sides of the foil and parallel to it. The water streams leaving the slit-shaped nozzles were directed parallel to the foil and vertically toward the water surface. Thus, the water streams did not directly impinge upon the foil. The distance between the "frost-line" to the die gap was 75 mm at the edge of the foil and varied in the center of the foil between 65 mm and 85 mm.

The processed foil had a width of approx. 900 mm. At its both edges, the foil had a strip of 70 mm width each, and 570 μ microns thickness. The center part of the foil with the predetermined thickness of about 300 μ microns had a width of 760 mm. The center part of the strip, however, had many bumps, so that when passing through the take-off rollers, folds were impressed into the foil.

Upon cutting the foil to strips, the strips with serrated edges resulted, such strips being unsuitable for further production and the folds tended to cause rupture of the foil, or strips, respectively.

EXAMPLE OF INVENTION

This example was run the same as the process described above with one difference. In contrast to the before-mentioned example, the foil was impinged at both sides by a water stream of 20° C through slit-shaped nozzles, arranged approx. 20 mm below the cooling bath level and in a 20 mm distance from the foil.

The water streams were directed against the direction of course of the foil. The angle between the respective planes of said streams and the plane of the foil was 75°, an angle of incidence α of 15°.

The processed foil had a width of 950 mm. At its both edges the foil had a strip of 30 mm width each and 430 microns thickness. The center part of the foil with the predetermined thickness of 300 microns had a width of 890 mm. The foil portion of 890 mm width is of excellent quality and is completely flat, i.e., no bumps. The foil left the take-off rollers without folds and was cut to strips without serrated edges and without any problem during the further production steps.

After the foil of the Prior Art Example was stretched laterally after gripping it between opposed pairs of clamping bars laid parallel to the respective edges just inside the aforesaid 70 mm edge strips of the foil and was also stretched longitudinally similarly with the opposed pairs of clamping bars laid transversely across the foil at opposite ends of the first-mentioned bars, the rectangular area of the foil between the four sets of clamping bars had in its midportion a substantially circular depression of sagging foil with an irregular or bumpy surface.

Similar stretching of the foil of the Example of Invention with the foil-edge clamping bars laid just inside the aforesaid 30 mm edge strips left a still smooth, still planar foil.

Besides polypropylene, other thermoplastic synthetic polymers which can be extruded as melts and shaped into foils by the process of the invention herein include polyethylene, polyesters such as polyethyleneterephthalate, polyamides such as nylon 6, nylon 6,6 and nylon 6,10, polyurethanes and other melt-extrudable, foil-forming homopolymers and copolymers.

We claim:

1. A process for cooling a planar freshly extruded, incompletely solidified foil of a thermoplastic polymer which comprises extruding said planar foil into a liquid cooling bath, and directing simultaneously against said foil below but near the bath surface along a line of incidence extending the entire width of said foil two narrow, unbroken streams of cooling liquid against directly opposite sides of said foil and angularly against the respective sides of said foil in a direction opposite to the direction of movement of said foil into said bath at an angle of incidence of each between 15° and 45° relative to a plane which is normal to said foil at the line of incidence of said respective stream against said foil.

2. An apparatus for cooling a freshly extruded, incompletely solidified, planar foil of a thermoplastic polymer which comprises an extrusion slot nozzle for extruding downwardly a planar foil of molten, thermoplastic polymer, a tank directly below said nozzle and adapted to hold a body of cooling liquid, a pair of tubes extending longitudinally in position to be normally immersed in said body of liquid and substantially parallel to and in juxtaposition to the foil entering said body of cooling liquid and also substantially parallel to and near the upper surface of said body of liquid, said tubes being positioned substantially symmetrically on opposite sides of said foil whereby two of said streams are applied simultaneously against directly opposite sides of said foil, each tube having a longitudinal slit which faces said foil and is at least substantially coextensive with the length of said slot nozzle and the width of the foil extruded therefrom, means to supply a cooling liquid to said tubes for flow thereof out of respective slits as a narrow stream directed against said opposite sides of said foil immediately after its entry into said body of liquid, and each slot facing said foil to provide a line of incidence of its stream of cooling liquid below the bath surface and to provide an angle of incidence between 15° and 45° relative to a plane which is normal to said foil at the line of incidence of said respective stream against said foil.

3. An apparatus for cooling a freshly extruded, incompletely solidified foil of a thermoplastic polymer which comprises an extrusion slot nozzle for extruding downwardly a foil of molten, thermoplastic polymer, a tank directly below said nozzle and adapted to hold a body of cooling liquid, a tube extending longitudinally in position to be normally immersed in said body of liquid and substantially parallel to and in juxtaposition to the foil entering said body of cooling liquid and also substantially parallel to and near the upper surface of said body of liquid, said tube having a longitudinal slit which faces said foil and is at least substantially coextensive with the length of said slot nozzle and the width of the foil extruded therefrom, a pipe at least substantially coextensive with said slit and extending longitudinally inside said tube in spaced relationship thereto, said pipe having a plurality of liquid discharge holes directed toward the side of said tube which is directly opposite to said longitudinal slit whereby a cooling liquid is adapted to be discharged from said slit as a narrow stream directed against a side of said foil immediately after its entry into said body of liquid.

4. An apparatus as claimed in claim 3 wherein said slit faces said foil to provide along said foil a line of incidence of its narrow stream of cooling liquid against said foil below the bath surface and at an angle of incidence between 0° and 60° relative to a plane which is normal to said foil at the line of incidence of said respective stream against said foil.

5. An apparatus as claimed in claim 4 wherein said angle of incidence is between 15° and 45°.

6. An apparatus as claimed in claim 3, wherein said apparatus embodies two of said tubes positioned substantially symmetrically on opposite sides of said foil whereby two of said streams are applied simultaneously against directly opposite sides of said foil.

* * * * *